July 29, 1969
P. S. KOMOR
3,457,866
WELL PUMPING APPARATUS
Filed Jan. 25, 1968
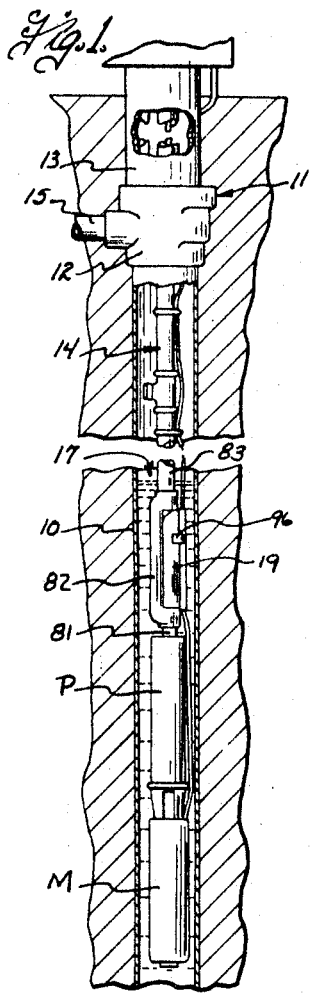
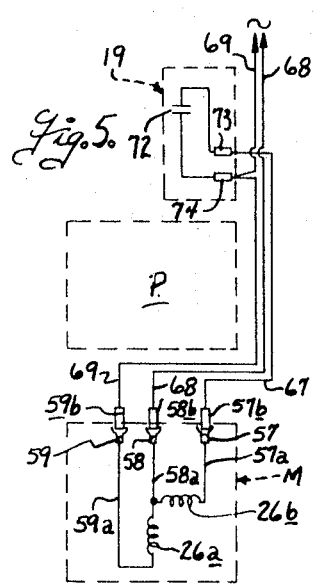
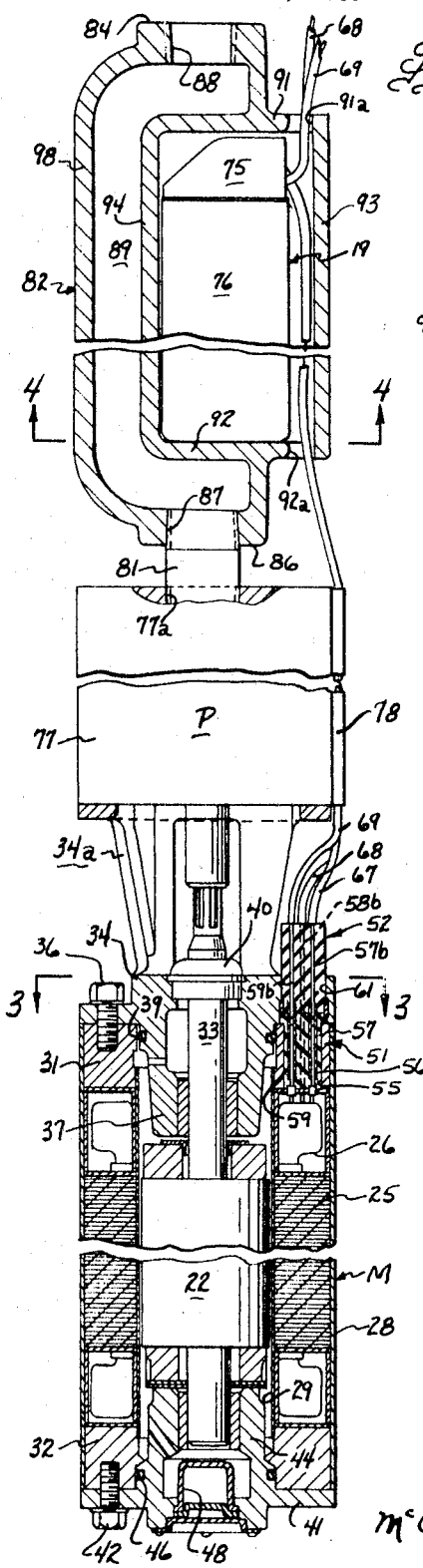
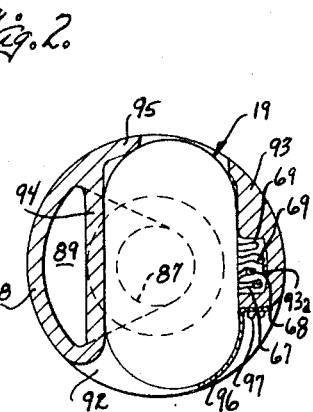
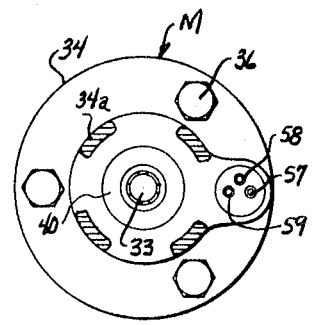
Inventor
Peter S. Komor
By
McCanna, Morsbach & Pillote
Attorneys United States Patent Office 3,457,866
Patented July 29, 1969

3,457,866
WELL PUMPING APPARATUS
Peter S. Komor, Davenport, Iowa, assignor to Red Jacket Manufacturing Company, Davenport, Iowa, a corporation of Iowa
Filed Jan. 25, 1968, Ser. No. 700,516
Int. Cl. F04d 13/02, 13/06, 13/08
U.S. Cl. 103—87                                                  5 Claims

ABSTRACT OF THE DISCLOSURE

A well casing extending to ground level and having a pump and a submersible electric motor therein. A drop pipe connected to the pump outlet and including a casting defining a pocket for receiving a motor capacitor unit and also a flow channel around the motor capacitor unit.

BACKGROUND

The invention peretains to well pumping apparatus of the type including a well casing having a pump and a submersible electric motor therein.

Single-phase induction motors having main and start windings and three leads to the windings, are commonly used in submersible motor units. It is also common to use a motor capacitor in the circuit to the start winding to shift the phase. In some installations, the motor capacitor has been located remote from the motor, as in an enclosure at the top of the well casing. Such installations require three wires in the well casing to supply power to the motor and to connect the motor capacitor in circuit. Thus, motors used in such installations are commonly called three-wire motors.

To necessitate the use of only two wires in the well casing, the motor capacitor has heretofore been located at the motor, and the motor operated as a permanent split capacitor type. In some installations, the motor capacitor was positioned within the sealed motor enclosure. This, obviously, requires a special motor construction. Motor capacitors in separate imperforate units have also been utilized, such as illustrated in U.S. Patent No. 3,248,582. The aforementioned patent also requires a special motor construction including a special stator with plug receptacles at both the upper and lower ends. Thus, both types require special motor constructions to provide for only two wires in the well casing and leading to the power supply. As a result, permanent split capacitor motors such as these have become known as two-wire motors.

As described above, different motor constructions (i.e., two-wire and three-wire motors) have been required for different installations. Thus, different motors must be manufactured, supplied, and stocked. Heretofore, it has not been possible to utilize one motor type for the different installations.

SUMMARY

The present invention relates to a well pumping apparatus and more particularly to such an apparatus including a well casing having a pump and a submersible single phase induction motor disposed in the casing, a motor capacitor unit located above the pump and motor, and means for providing a flow channel around the motor capacitor unit.

An important object of this invention is to provide a well pumping apparatus in which a three-wire motor is utilized with only two wires extending into a well casing.

Another object of this invention is to provide a well pumping apparatus which includes a submersible electric motor and a motor capacitor unit, which unit can be readily removed and replaced without necessitating opening of the motor enclosure.

Still another object of the present invention is to provide a well pumping apparatus in which the motor capacitor unit is mounted above the pump and motor and wherein the flow channel of the delivery conduit is laterally offset to permit flow past the motor capacitor unit.

These, and other objects and advantages of the present invention, will become apparent as the same becomes better understood from the following detailed description when taken in conjunction with the accompanying drawing.

DRAWING

FIGURE 1 is a fragmentary vertical sectional view through an embodiment of the present invention;

FIG. 2 is a fragmentary view partly in elevation and partly in vertical section, and illustrating the motor, pump, motor capacitor unit, and offset means;

FIG. 3 is a view taken generally along line 3—3 of FIG. 2 and with the plug-in connector removed;

FIG. 4 is a cross-sectional view taken along line 4—4 of FIG. 2; and

FIG. 5 is a diagrammatic view illustrating the electrical circuits utilized in the present invention.

DESCRIPTION

Reference is now made more particularly to the drawings which illustrate the best presently known mode of carrying out the invention and wherein similar reference characters indicate the same parts throughout the several views.

In FIG. 1 is shown a well which has a well casing extending from a point above the ground downwardly into the well opening in accordance with standard practice in encasing wells. The well casing provides a generally circular opening and advantageously has a generally upright longitudinal axis. As shown, the well casing includes a conventional casing tube 10 of predetermined size which normally terminates at a point below the frost level in the ground. Attached to the upper end of the casing tube 10 in a water-tight manner is a pitless underground unit, generally designated 11, which customarily includes a discharge head 12 and a casing extension 13 which extends to a point above the ground level. The discharge head 12 is preferably of the type having a removable packer unit (not shown) and which packer unit spans the discharge head and communicates a downwardly extending drop pipe or delivery conduit 14 with a lateral discharge pipe 15 on the discharge head 12. The delivery conduit 14 extends downwardly in the casing to a pump unit P submerged in a fluid such as water, generally designated by the numeral 17. A submersible electric motor M is attached to the pump P to drive the same and, in accordance with the present invention, a motor capacitor unit, generally designated 19, is located above the motor and pump and connected to the motor windings. Preferably, the motor, pump, motor capacitor unit, and delivery conduit are dimensioned and arranged for axial insertion and removal as a unit from the well casing.

The submersible motor M preferably is a single phase induction motor having main and start windings and which may be ordinarily used as a capacitor start, induction run motor. The motor is preferably of the aforedescribed three-wire type and has a three lead disconnect at its upper end (see FIG. 2). As shown, the motor M includes a stator and a rotor 22 disposed in the stator. The stator comprises a laminated core structure 25 having motor windings 26 which include main windings 26a and start windings 26b (see FIG. 5). The core and windings are disposed within an imperforate outer shell 28. The motor windings 26 are preferably sealed and, for this purpose, an inner tubular member or liner 29 is disposed within the core, and ring members 31 and 32 are provided at opposite ends of the stator and sealed to the outer shell 28 and to the liner 29 to form a sealed enclosure for the stator windings. The rotor 22, disposed in the stator, has a motor shaft 33 extending outwardly of the motor enclosure for connection to the pump P. An upper end member 34 overlies the stator ring member 31 and is removably mounted by fasteners 36. The upper end member 34 conveniently includes a bearing hub 37 extending axially from one side of the end member into the rotor chamber and has an O-ring 39 which engages the ring member 31. A shaft seal 40 is provided on the motor end member 34 to seal the inner face with the shaft 33. A fitting 34a is conveniently formed integrally with the upper end member 34 for attachment to the pump unit P to mount the motor M thereon.

The lower end of the stator body is enclosed by an end member 41 which overlies the stator ring member 32 and is mounted by fasteners 42. The end member 41 extends into the ring member 32 and carries a bearing hub 44 for rotatably supporting the lower end of the shaft 33. The lower end member 41 is sealed to the ring member 32 as by an O-ring 46, thereby cooperating with the aforedescribed structure to provide an imperforate motor housing. Preferably, the chamber containing the rotor is filled with an oil (not shown) having suitable insulating and lubricating characteristics. In order to accommodate thermal expansion and contraction of the oil, a movable wall or expansion chamber 48 is advantageously mounted on the end member 41 and has one side exposed to the fluid in the rotor chamber.

A plug-in type electrical disconnect including a first connector member 51 and a second connector member 52, is provided on the upper end of the motor M to enable connection of the capacitor unit 19 and the power supply to the stator windings 26a and 26b. The disconnect is mounted on the motor housing in sealed relation therewith. As best shown in FIG. 2, a bore 55 is formed in the ring member 31 and is spaced radially from the center of the stator. The first connector member 51 includes a first insulating body 56 mounted at the inner end of bore 55 and carrying electrical prongs 57, 58, and 59 (see FIG. 3). Preferably, the main and start windings are connected to three leads which are connected to the prongs, as is hereafter described. Each lead prong 57–59 has an associated socket member carried by the first insulating body, as shown in FIG. 2. The insulating body may be formed of various suitable dielectric materials, and is advantageously formed of a resilient dielectric material such as rubber. As shown, the body 56 terminates a substantial distance inwardly of the outer end of a bore 61 in the end member 34 to define a socket in the end member 34.

The second connector member 52 includes a body of dielectric material and comprises a plug portion dimensioned to be received in the aforementioned socket defined by bore 61. Metal connectors 57b–59b (see FIG. 2) are embedded in the connector member 52 and are arranged to interfit with the socket members to operatively connect the connectors 57b–59b with the lead prongs 57–59, respectively. While a particular plug-in disconnect construction has been illustrated and described, it is apparent that other constructions could be utilized, if desired. For example, the plug-in disconnect may be of the type illustrated in U.S. Patent No. 3,294,993.

Wires 67, 68, and 69 are connected to the three connectors 57b–59b, respectively, to provide electrical connection to the three leads. Referring to FIG. 5, the windings 26, as previously described, include the main winding 26a and the start winding 26b. As shown, a main lead 59a connects the main winding 26a to prong 59; a start lead 57a connects start winding 26b to prong 57; and a common lead 58a connects both windings to prong 58. As shown, wires 68 and 69 are connected to a source of supply and to connectors 58b and 59b, respectively, to supply power to the main winding 26a. Start winding 26b is connected in series with a capacitor 72 in motor capacitor unit 19. As shown, one side of the capacitor 72 is operatively connected to wire 67 at a terminal 73. The other side of capacitor 72 is operatively connected to supply wire 69 at a terminal 74.

The motor capacitor unit 19 preferably includes a sealed casing 76 and is mounted in a position above the pump and motor, as previously indicated. Sealing of the capacitor unit requires only sealing the electrical terminals 73 and 74 which is advantageously accomplished by a potting compound, such as epoxy, as shown at 75 in FIG. 2. The sealing of the rest of the capacitor unit requires only protection of the casing 76 against the corrosive effect of the fluid. This can be accomplished in several ways such as painting, dip coating, coating with potting compounds, and the like.

The pump P may be of any convenient construction well known to those skilled in the art. In general, the pump has a housing 77 with an inlet (not shown) at its lower end and a generally axially disposed outlet 77a at its upper end. The pump is mounted on the motor fitting 34a and has a driving connection to the motor shaft 33. A clamp 78, conveniently U-shaped in cross section, is mounted at one side of housing 77 to protect the wires 67–69 and hold them closely adjacent the pump.

Referring to FIGS. 1 and 2, it can be seen that drop pipe or delivery conduit 14 includes a first straight portion 81 connected to the outlet 77a of the pump, an offset portion 82, and a second straight portion 83 extending upwardly from the offset portion. As can be seen, straight portions 81 and 83 are generally axially disposed in the well casing. In the embodiment illustrated, the offset portion 82 is in the form of a casting having an upper end 84 and a lower end 86. An inlet 87 at the lower end is provided for connection to the first portion 81. An outlet 88 is provided at the upper end for connection to the second portion 83. Intermediate the upper and lower ends, the casing defines a laterally offset flow channel 89 for a purpose which will hereafter become apparent.

The casting also provides a pocket defined by an upper wall 91, a lower wall 92, a side wall 93, a common wall 94, and a small end wall 95. Walls 91 and 92 are spaced apart a distance at least as great as the height of the capacitor unit 19, and walls 93 and 94 are spaced apart a distance at least as great as the width of the capacitor unit. As can be seen in FIG. 4, the pocket is generally open at one lateral side for insertion and removal of the capacitor unit therefrom. Wall 93 has a groove 93a to receive and protect the wires 67–69. For this purpose, openings 91a and 92a are provided in the upper and lower walls, respectively, for passage of the wires therethrough. A clamp 96 is secured to wall 93 as by a fastener 97 and extends at least part way across the open side of the pocket to engage the capacitor unit 19, and hold the same in the pocket. As can be seen in FIG. 2, the lateral offset flow channel 89 provides a flow area of the drop pipe around the capacitor unit. Wall 94 is a common wall between the flow channel and the pocket. An arcuate wall 98 provides the other wall for the flow channel. As seen in FIG. 4, the offset portion 82, capacitor unit 19, and clamp 96 are all advantageously within an imaginary circle which passes through the extremities of the assembly. The radius of this imaginary circle is less than the size of the casing tube 10 to enable axial insertion and removal of the assembly into the well. In this manner, then, the offset portion 82 positions and holds the capacitor unit 19, provides a flow channel therearound, protects the wires, and, as a whole, provides an assembly which can be axially inserted and removed from the well casing.

If required, the motor capacitor unit 19 may be quickly removed and replaced by pulling the drop pipe 14 along with the connected pump and motor from the well casing, loosening fastener 97 to remove the clamp 96, and removing the capacitor unit 19 from the pocket. It is deemed obvious that the capacitor can be replaced without opening the housing of the motor M.

From the foregoing, it is thought that the construction and operation of the apparatus will be readily understood. The well pumping apparatus includes a well casing having a pump, a submersible electrical motor, and a delivery conduit therein. The delivery conduit includes an offset portion for providing flow around the motor capacitor unit which is mounted above the pump and motor. The motor capacitor unit is mounted externally of the motor housing in such a manner that the capacitor can be readily detached and removed. Three wires are connected to the three motor leads and extend past the pump to the motor capacitor. Two of the wires extend upwardly along the well casing for connection to a power source. In this manner, an ordinary three-wire motor is utilized with only two power supply wires extending into the well casing.

While a preferred embodiment of the invention has herein been illustrated and described, this has been done by way of illustration and not limitation, and the invention should not be limited except as required by the scope of the appended claims.

What is claimed is:

1. A well pumping apparatus including a well casing extending from a point above ground downwardly into the well and having a longitudinal axis; a pump in the well casing dimensioned for axial insertion and removal therefrom; a submersible single phase electric motor operatively connected to the pump for driving the same and dimensioned for axial insertion and removal from the well casing, said motor having a main winding and a start winding, a main lead connected to the main winding, a start lead connected to the start winding, and a common lead connected to both windings; a motor capacitor unit in the well casing above the pump and motor and having a preselected height measured along said well casing axis; first and second wires operatively connected to the main and common leads respectively and extending out of the well casing to a source of electrical power; a third wire operatively connected to the start lead and the motor capacitor; means for operatively connecting the capacitor to the first wire; delivery conduit means connected to the pump for delivering fluid from the well and having at least a major portion disposed generally coaxial with the well casing; said delivery conduit means including offset means for providing a flow channel laterally offset from said well casing axis and axially extending a distance at least equal to the height of the capacitor; mounting means for mounting the motor capacitor unit on the offset means; and said offset means and the motor capacitor unit mounted thereon dimensioned for axial insertion and removal from the well casing.

2. A well pumping apparatus as set forth in claim 1 wherein the well casing defines a generally circular opening, and wherein the offset means, the motor capacitor unit, and the mounting means in assembled relationship all lie within an imaginary circle which passes through the outermost points of the assembly and which has a size smaller than the well casing opening.

3. A well pumping apparatus as set forth in claim 1 wherein the offset means comprises a casting having upper and lower ends, said casting having an inlet at the lower end and an outlet at the upper end, means defining a pocket intermediate the ends for receiving the motor capacitor unit, means defining a flow channel communicating with the inlet and outlet and passing around the pocket, and the pocket and flow channel having at least one common wall.

4. A well pumping apparatus as set forth in claim 1 wherein the offset means comprises a casting having upper and lower ends, said casting having an inlet at the lower end and an outlet at the upper end, wall means intermediate the ends defining a pocket for receiving the motor capacitor unit, said wall means including first and second walls on opposite sides of the capacitor, said walls arranged to provide an opening for lateral insertion and removal of the motor capacitor unit, and the mounting means being engaged with one of said walls and extending at least part way across the pocket opening for holding the motor capacitor unit in the pocket.

5. A well pumping apparatus as set forth in claim 1 wherein the motor has a sealed housing having upper and lower ends and a shaft extending outside the housing at the upper end, a disconnect coupling at te upper end of the housing for operatively connecting the wires to the leads, wherein the pump is mounted above the motor and has a driving connection to the motor shaft, said pump having upper and lower ends and an inlet at the lower end, said pump having a generally axially disposed outlet at the upper end, and wherein the delivery conduit means includes a first straight pipe portion connected to the offset means and to the pump outlet and a second straight pipe portion connected to the offset means and extending upwardly therefrom.

References Cited

UNITED STATES PATENTS 3,248,582 4/1966 Brown _____ 310—87
3,261,296 7/1966 Weber.

ROBERT M. WALKER, Primary Examiner

U.S. Cl. X.R.

310—68, 87